(12) United States Patent
Berger

(10) Patent No.: US 12,555,814 B2
(45) Date of Patent: Feb. 17, 2026

(54) FUEL CELL UNIT

(71) Applicant: Robert Bosch GmbH, Stuttgart (DE)

(72) Inventor: Markus Berger, Vaihingen An der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 813 days.

(21) Appl. No.: 17/910,434

(22) PCT Filed: Feb. 16, 2021

(86) PCT No.: PCT/EP2021/053695
§ 371 (c)(1),
(2) Date: Sep. 9, 2022

(87) PCT Pub. No.: WO2021/180430
PCT Pub. Date: Sep. 16, 2021

(65) Prior Publication Data
US 2023/0163340 A1   May 25, 2023

(30) Foreign Application Priority Data
Mar. 10, 2020  (DE) .................. 10 2020 203 044.8

(51) Int. Cl.
*H01M 8/2483*  (2016.01)
*H01M 8/0267*  (2016.01)

(52) U.S. Cl.
CPC ....... *H01M 8/2483* (2016.02); *H01M 8/0267* (2013.01)

(58) Field of Classification Search
CPC ................................................. H01M 8/2483
See application file for complete search history.

(56) References Cited

U.S. PATENT DOCUMENTS

2006/0024561 A1* 2/2006 Sato .................... H01M 8/0267
429/514
2008/0311461 A1* 12/2008 Farrington .......... H01M 8/0258
429/454

(Continued)

FOREIGN PATENT DOCUMENTS

CN     102113159 A    6/2011
CN     107507993 A    12/2017

(Continued)

OTHER PUBLICATIONS

Translation of International Search Report for Application No. PCT/EP2021/053695 dated May 6, 2021 (2 pages).

*Primary Examiner* — Brian R Ohara
(74) *Attorney, Agent, or Firm* — Michael Best & Friedrich LLP

(57) ABSTRACT

The invention relates to a fuel cell unit as a fuel cell stack for the electrochemical generation of electrical energy, comprising stacked fuel cells, the fuel cells each comprising a proton exchange membrane, an anode, a cathode, a gas diffusion layer, a bipolar plate (10) with three separate channel structures (29) with channels for the separate passage of oxidising agents, fuel and cooling fluid. The channel structures (29) have an inlet region (37) and an outlet region (38) for the oxidising agents, the fuel and the cooling fluid, at least one feed channel (43) for feeding the oxidising agents as process fluid into the gas spaces for oxidising the fuel cells, at least one feed channel (48) for feeding fuel as process fluid into the gas spaces for fuel of the fuel cells, at least one supply channel (50) for the coolant as process fluid for supplying the coolant into a channel for coolant, a distribution structure (45) for directing and distributing the process fluids from the supply channels (43, 48, 50) into the channel structures (29) of the bipolar plates (10), at least two supply channels (43, 48, 50) being formed side by side in the (Continued)

longitudinal direction (57) when the inlet region (37) is formed with an extent predominantly in the transverse direction (58) between a transverse side (56) of the fuel cell (2) and the channel structure (29), or at least two feed channels (43, 48, 50) being formed side by side in the transverse direction (58) when the inlet region (37) is formed with an extent predominantly in the longitudinal direction (57) between a longitudinal side (55) of the fuel cell (2) and the channel structure (29).

13 Claims, 5 Drawing Sheets

(56) References Cited

U.S. PATENT DOCUMENTS

| | | | |
|---|---|---|---|
| 2011/0171556 A1* | 7/2011 | Sugawara | H01M 8/0267 |
| | | | 429/459 |
| 2018/0145352 A1 | 5/2018 | Kondo et al. | |
| 2019/0074524 A1* | 3/2019 | Tomana | H01M 8/026 |

FOREIGN PATENT DOCUMENTS

| | | | | |
|---|---|---|---|---|
| CN | 109075357 A | 12/2018 | | |
| CN | 110854404 A | 2/2020 | | |
| DE | 102006019114 A1 | 10/2006 | | |
| DE | 102008056900 A1 * | 5/2010 | | H01M 8/241 |
| EP | 1255315 A1 * | 11/2002 | | H01M 8/0276 |
| EP | 2823525 | 1/2015 | | |

* cited by examiner

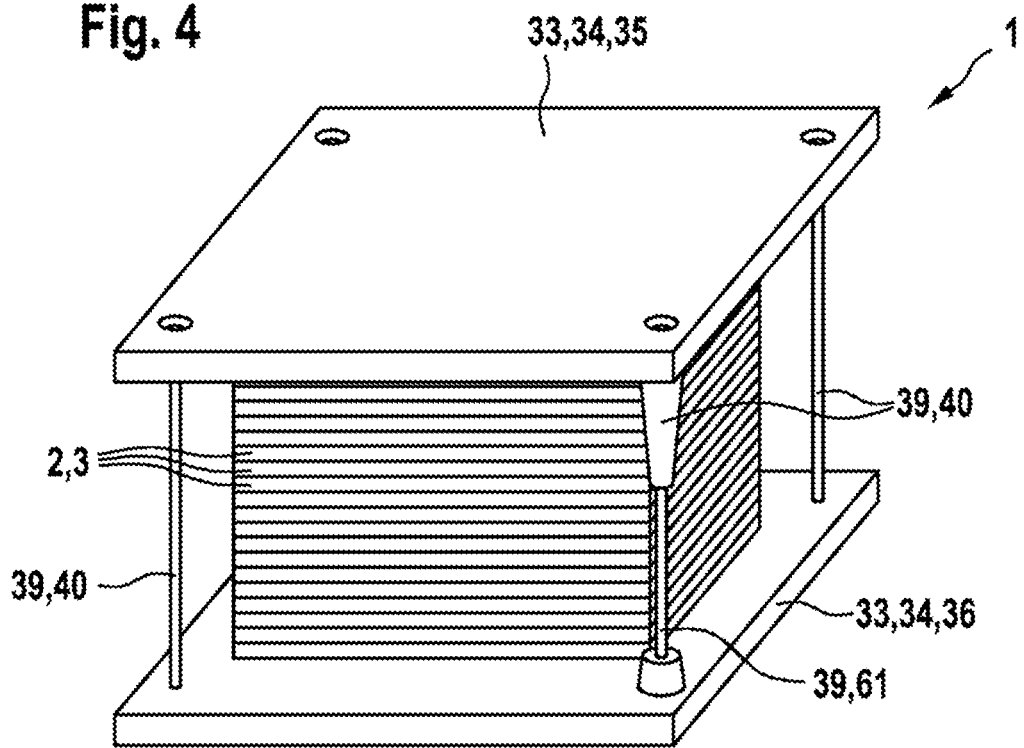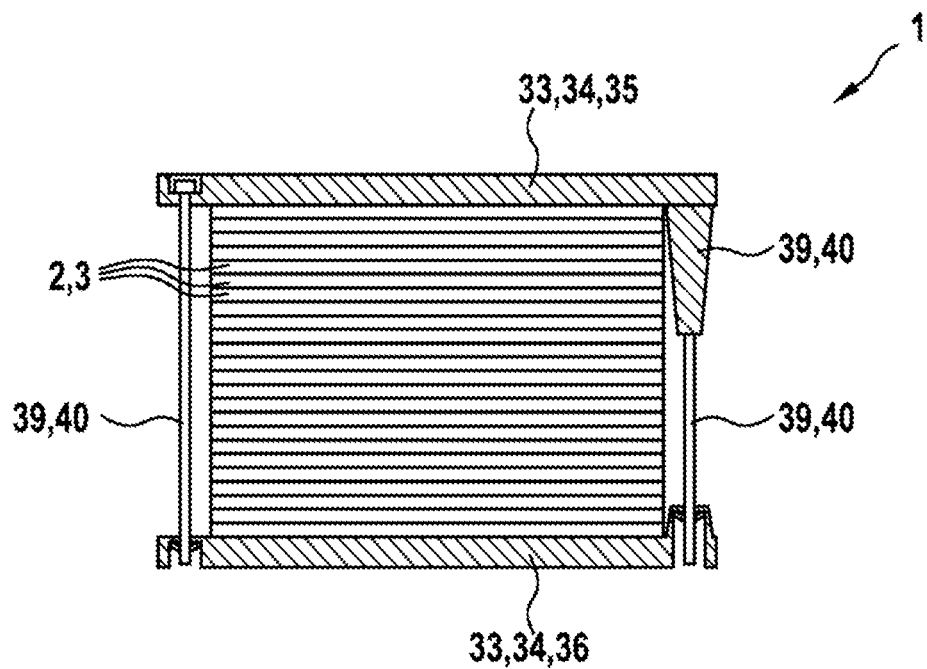

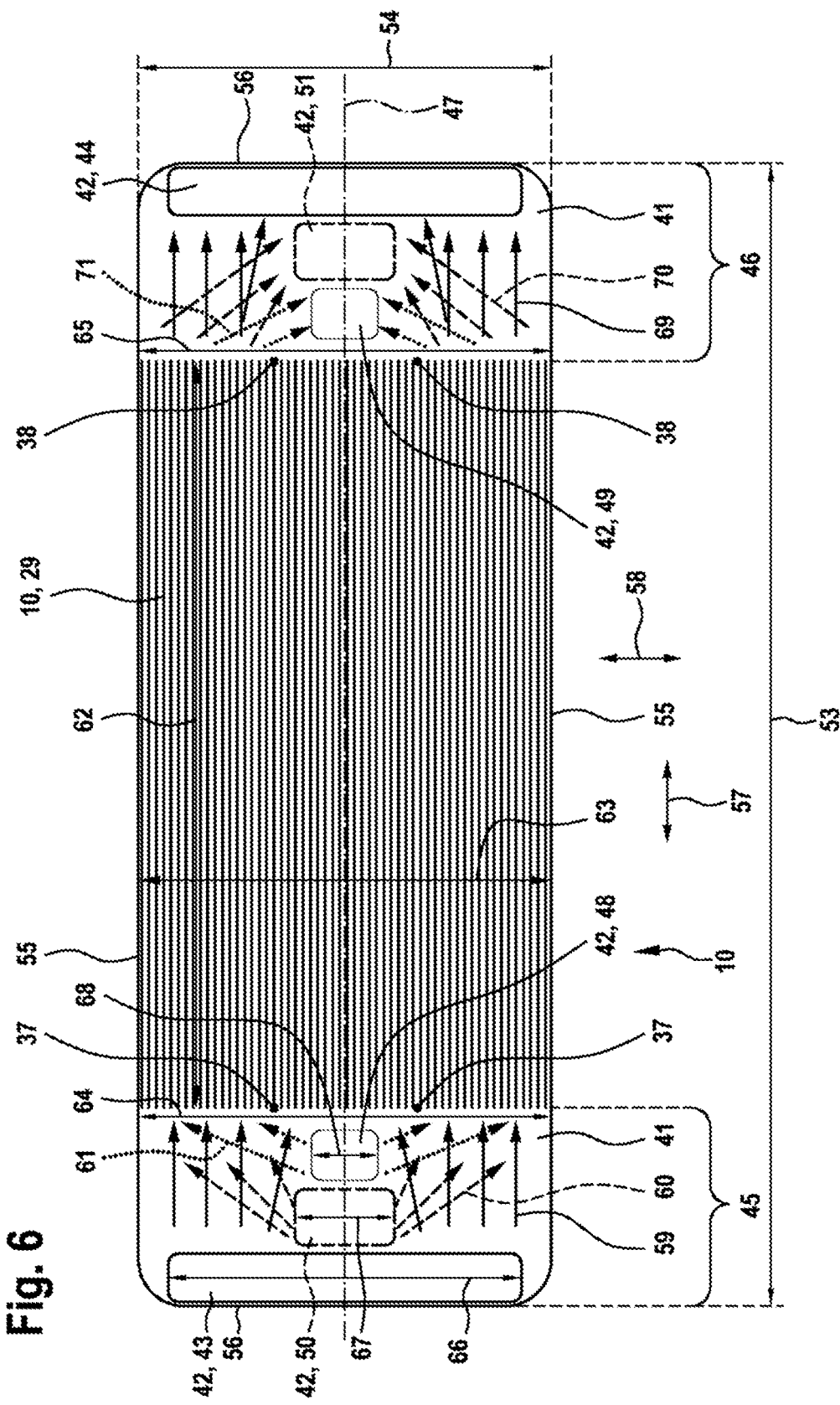

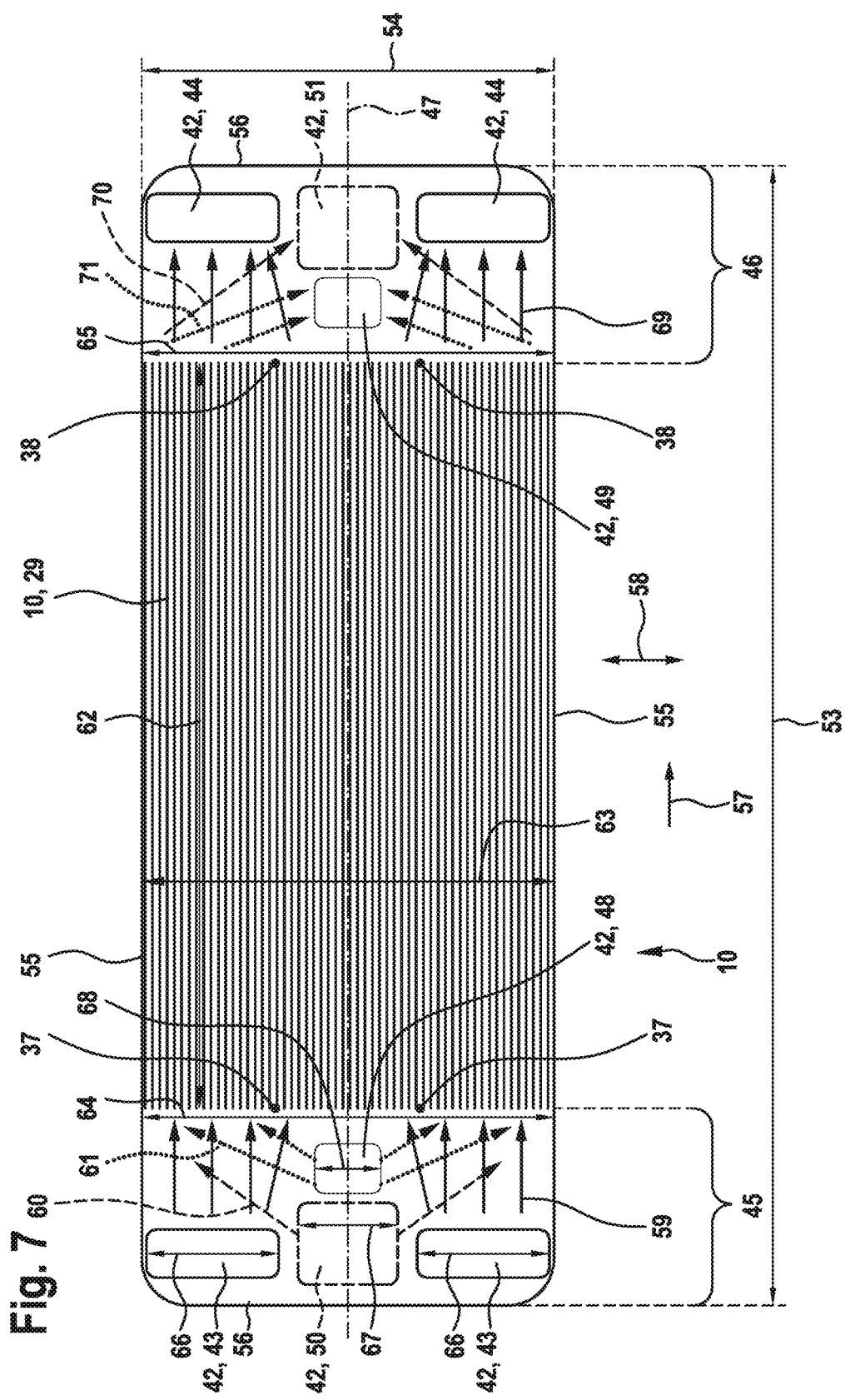

FUEL CELL UNIT

BACKGROUND

The present invention relates to a fuel cell unit and to a fuel cell system.

Fuel cell units in the form of galvanic cells convert continuously fed fuel and oxidizing agent into electrical energy and water by means of redox reactions at an anode and cathode. Fuel cells are used in a wide variety of stationary and mobile applications, for example in houses which are not connected to a mains supply or in motor vehicles, in rail transport, in aviation, in space travel and in shipping. In fuel cell units, a plurality of fuel cells are arranged one above the other in a stack.

In fuel cell units, a large number of fuel cells are arranged one above the other to form a fuel cell stack. Within each of the fuel cells there is a gas space for oxidizing agent, that is to say a flow space for the passage of oxidizing agent, for example air from the environment with oxygen. The gas space for oxidizing agent is formed by channels at the bipolar plate and by a gas diffusion layer for a cathode. The channels are thus formed by a corresponding channel structure of a bipolar plate, and the oxidizing agent, namely oxygen, passes through the gas diffusion layer to the cathode of the fuel cells. Water forms at the cathodes as a result of the electrochemical reaction, so that there is thus an accumulation of water, or condensate, at the gas space for oxidizing agent, in particular at the gas diffusion layer. The accumulation of water in the region of the cathode, that is to say in particular at the gas diffusion layer for the cathode, leads to the catalyst layer being undersupplied with oxidizing agent owing to the flooding of the gas diffusion layer with water, so that the electric voltage generated by the fuel cell decreases sharply as a result. Furthermore, this causes increased ageing of the fuel cell owing to the accumulation of water. For this reason, attempts are made to avoid such accumulations of water in the gas space for oxidizing agent. The air from the environment is introduced into the gas spaces for oxidizing agent by a gas conveying device, for example a fan or a compressor.

The oxidizing agent is introduced into the gas spaces for oxidizing agent through at least one feed channel and is discharged from the gas spaces for oxidizing agent through at least one discharge channel. Prolongations as sealing plates are formed in the bipolar plates and the membrane electrode assemblies, and fluid openings are incorporated in the sealing plates. The fluid openings are oriented in the fuel cell unit so as to be stacked in alignment, such that the fluid openings form the at least one feed channel and the at least one discharge channel. Gaskets are arranged between the sealing plates in the region of the fluid openings so that the oxidizing agent does not pass in an uncontrolled manner into the gaps between the sealing plates. The oxidizing agent is introduced from the at least one feed channel into the channels for oxidizing agent. The feed channel for oxidizing agent has a small transverse extent, so that a transverse lateral distribution is necessary in a manifold structure between the feed channel for oxidizing agent and an inlet region of the channel structure having the channels for oxidizing agent. This is a disadvantage because the oxidizing agent thus already flows with a different temperature and pressure into the channels for oxidizing agent. The same applies analogously to the coolant and the fuel as the further process fluids of the fuel cells, so that they too flow with the mentioned disadvantages into the channels for coolant and fuel at the other channel structures of the bipolar plate. Feed and discharge channels for fuel and coolant are formed in an analogous manner as fluid openings at the sealing plates. Owing to the introduction of each process fluid only at a part-region in the form of an inlet region at one end of the channel structure, the process fluids do not flow through the channel structure in parallel in all places, so that a transfer of heat between the process fluids within the channel structures is possible to only a limited extent. This results in large differences in the temperature and humidity in the gas spaces for oxidizing agent and fuel. The efficiency of the fuel cell thus falls and ageing is increased.

DE 10 2006 019 114 A1 discloses a fuel cell system having a plurality of fuel cells, wherein each of the fuel cells comprises a membrane electrode assembly, an anode catalyst layer on a first side of the membrane electrode assembly and a cathode catalyst layer on a second side of the membrane electrode assembly, wherein the plurality of fuel cells are arranged in at least two stages, wherein the plurality of fuel cells in each of the at least two stages are arranged in a parallel configuration and the stages are arranged in a series configuration, wherein a first stage has first plurality of fuel cells and a second stage has a second plurality of fuel cells, wherein the first plurality of fuel cells comprises a larger number of fuel cells than the second plurality of fuel cells; an anode gas inlet manifold in communication with the first stage; at least one inlet/exhaust manifold for anode gas, wherein the inlet/exhaust manifold for anode gas allows anode exhaust gas to exit the first stage and allows the anode exhaust gas to enter the second stage; and an anode gas exhaust manifold in communication with the second stage.

SUMMARY

Fuel cell unit according to the invention in the form of a fuel cell stack for the electrochemical generation of electrical energy, comprising fuel cells arranged in a stack, the fuel cells each comprising a proton exchange membrane, an anode, a cathode, a gas diffusion layer, a bipolar plate with three separate channel structures with channels for the separate passage of oxidizing agent, fuel and cooling fluid, and the channel structures have an inlet region and an outlet region for the oxidizing agent, the fuel and the cooling fluid, at least one feed channel for feeding oxidizing agent as process fluid into the gas spaces for oxidizing agent of the fuel cells, at least one feed channel for feeding fuel as process fluid into the gas spaces for fuel of the fuel cells, at least one feed channel for coolant as process fluid for feeding the coolant into a channel for coolant, a manifold structure for guiding and distributing the process fluids from the feed channels into the channel structures of the bipolar plates, wherein at least two feed channels are formed side by side in a longitudinal direction when the inlet region is configured with an extent predominantly in a transverse direction between a transverse side of the fuel cell and the channel structure, or at least two feed channels are formed side by side in the transverse direction when the inlet region is configured with an extent predominantly in the longitudinal direction between a longitudinal side of the fuel cell and the channel structure. The longitudinal direction and the transverse direction are oriented parallel to the notional planes spanned by the fuel cells.

In a further variant, at least three feed channels are formed side by side in the longitudinal direction when the inlet region is configured with an extent predominantly in the transverse direction between a transverse side of the fuel cell and the channel structure.

In an additional embodiment, at least three feed channels are formed side by side in the transverse direction when the inlet region is configured with an extent predominantly in the longitudinal direction between a longitudinal side of the fuel cell and the channel structure.

In a supplementary embodiment, at least one feed channel is arranged substantially centrally in the transverse direction when the inlet region is configured with an extent predominantly in the transverse direction between a transverse side of the fuel cell and the channel structure. Substantially centrally preferably means that, in a section parallel to the notional planes spanned by the fuel cells, the midpoint or center of mass of the at least one feed channel is at a distance from a centric longitudinal center line of the fuel cells that is less than 30%, 20% or 10% of half the transverse extent of the fuel cells.

In a further embodiment, all the feed channels are arranged substantially centrally in the transverse direction when the inlet region is configured with an extent predominantly in the transverse direction between a transverse side of the fuel cell and the channel structure. Substantially centrally preferably means that, in a section parallel to the notional planes spanned by the fuel cells, the midpoint or center of mass of in each case the at least one feed channel is at a distance from a centric longitudinal center line of the fuel cells that is less than 30%, 20% or 10% of half the transverse extent of the fuel cells.

In a further embodiment, the at least one feed channel for feeding oxidizing agent is the feed channel that is at the greatest distance in the longitudinal direction from the inlet region of the channel structure when the inlet region is configured with an extent predominantly in the transverse direction between a transverse side of the fuel cell and the channel structure.

In an additional embodiment, the at least one feed channel for feeding fuel is the feed channel that is at the smallest distance in the longitudinal direction from the inlet region of the channel structure when the inlet region is configured with an extent predominantly in the transverse direction between a transverse side of the fuel cell and the channel structure.

Advantageously, separate first, second and third manifold channels for the first, second and third process fluid are formed in the manifold structure.

In a further embodiment, two of the first, second and third manifold channels are formed separately from one another in a direction perpendicular to the notional planes spanned by the fuel cells. In the case of horizontally oriented notional planes, two of the first, second and third manifold channels are thus formed separately from one another perpendicularly to the notional planes. The two of the first, second and third manifold channels are thus formed in a space-saving manner in different planes.

In a further embodiment, one of the first, second and third manifold channels is formed next to one of the other first, second or third manifold channels in a direction parallel to the notional planes spanned by the fuel cells. In the case of horizontally oriented notional planes, two of the first, second and third manifold channels are thus formed horizontally side by side. The manifold structure thus requires little installation space.

In a further embodiment, the fuel cell unit, in particular the fuel cells, has a longitudinal extent in a longitudinal direction and a transverse extent in a transverse direction, and the longitudinal direction and transverse direction are oriented perpendicular to one another and parallel to the notional planes spanned by the fuel cells.

In a supplementary variant, when the manifold structure is formed between a transverse side of the fuel cell unit and the channel structure of the bipolar plate, the transverse extent of the manifold structure corresponds substantially to the transverse extent of the inlet region of the channel structure. Substantially means preferably with a deviation of less than 30%, 20% or 10%.

Preferably, the first, second and third manifold channels are oriented at an angle relative to one another which is less than 45° or 30°.

In a further embodiment, the transverse extent or the sum of the transverse extents of the at least one feed channel for oxidizing agent corresponds substantially to the transverse extent of the inlet region of the channel structure preferably when the inlet region is configured with an extent predominantly in the transverse direction between the transverse side of the fuel cell and the channel structure. Substantially means preferably with a deviation of less than 30%, 20% or 10%. Thus substantially no transverse distribution of the fuel from the at least one feed channel to the inlet region of the channel structure is necessary.

Fuel cell system according to the invention, in particular for a motor vehicle, comprising a fuel cell unit in the form of a fuel cell stack with fuel cells, a compressed gas reservoir for storing gaseous fuel, a gas conveying device for conveying a gaseous oxidizing agent to the cathodes of the fuel cells, wherein the fuel cell unit is in the form of a fuel cell unit described in this patent application.

In a further embodiment there are formed in the longitudinal direction from the transverse side to the inlet region of the channel structure of the bipolar plate first the at least one feed channel for oxidizing agent and then the at least one feed channel for coolant and thereafter in the longitudinal direction the at least one feed channel for fuel.

In a further embodiment there are formed in the transverse direction from the longitudinal side to the inlet region of the channel structure of the bipolar plate first the at least one feed channel for oxidizing agent and then the at least one feed channel for coolant and thereafter in the transverse direction the at least one feed channel for fuel.

In a further embodiment, the transverse extent or the sum of the transverse extents of the at least one feed channel for oxidizing agent corresponds substantially to the transverse extent of the inlet region of the channel structure when the inlet region is configured with an extent predominantly in the transverse direction between the transverse side of the fuel cell and the channel structure. Substantially means preferably with a deviation of less than 30%, 20% or 10%. Thus substantially no transverse distribution of the oxidizing agent from the at least one feed channel to the inlet region of the channel structure is necessary.

Advantageously, the transverse extent or the sum of the transverse extents of the at least one feed channel for coolant is less than 90%, 70% or 50% of the transverse extent of the inlet region of the channel structure.

In a further variant, the transverse extent or the sum of the transverse extents of the at least one feed channel for fuel is less than 90%, 70% or 50% of the transverse extent of the inlet region of the channel structure.

In an additional embodiment, the at least one feed channel and/or the at least one discharge channel for oxidizing agent and/or fuel and/or coolant is oriented substantially perpendicular to the notional planes spanned by the fuel cells. The orientation of the at least one feed channel and/or discharge channel for oxidizing agent and/or fuel and/or coolant is the longitudinal axis and/or the direction of flow of the process fluid in the feed channel and/or discharge channel. Substantially perpendicular means preferably with a deviation of less than 30°, 20° or 10°.

In a supplementary variant, the inlet region and outlet region of the channel structure is formed exclusively between the transverse sides of the fuel cells and the channel structure when the inlet region and outlet region extends predominantly in the transverse direction. The inlet and outlet region is thus not formed between the longitudinal sides and the channel structure.

In an additional embodiment, the transverse extent of the inlet region corresponds substantially to the transverse extent of the channel structure and/or of the fuel cell when the inlet region is formed between the transverse sides of the fuel cell and the channel structure. Substantially means preferably with a deviation of less than 30%, 20% or 10%.

In a supplementary variant, the inlet region and outlet region of the channel structure is formed exclusively between the longitudinal sides of the fuel cells and the channel structure when the inlet region and outlet region extends predominantly in the longitudinal direction. The inlet and outlet region is thus not formed between the transverse sides and the channel structure.

In an additional embodiment, the longitudinal extent of the inlet region corresponds substantially to the longitudinal extent of the channel structure and/or of the fuel cell when the inlet region is formed between the longitudinal sides of the fuel cell and the channel structure. Substantially means preferably with a deviation of less than 30%, 20% or 10%.

In a supplementary embodiment, all the channels for oxidizing agent, fuel and coolant are formed in the channel structures of the bipolar plates, so that the oxidizing agent, the fuel and the coolant flow through the channels substantially in parallel. Substantially in parallel means preferably with a deviation of less than 30°, 20° or 10°.

In a further variant, the fuel cell unit comprises at least one discharge channel for discharging fuel from the fuel cells.

In a supplementary embodiment, the fuel cell unit comprises at least one discharge channel for discharging coolant from the fuel cells.

In a further embodiment, the at least one feed channel for feeding oxidizing agent is the feed channel that is at the greatest distance in the transverse direction from the inlet region of the channel structure when the inlet region is configured with an extent predominantly in the longitudinal direction between a longitudinal side of the fuel cell and the channel structure.

In an additional embodiment, the at least one feed channel for feeding fuel is the feed channel that is at the smallest distance in the transverse direction from the inlet region of the channel structure when the inlet region is configured with an extent predominantly in the longitudinal direction between a longitudinal side of the fuel cell and the channel structure.

In a further embodiment, at least one, in particular all, of the features disclosed in this intellectual property application in respect of a fuel cell is implemented in all of the fuel cells of the fuel cell unit.

In an additional embodiment, the fuel cells of the fuel cell unit are stacked in alignment with one another, in particular one above the other.

In a further variant, the fuel cell unit comprises at least one connecting device, in particular a plurality of connecting devices, and clamping elements.

Components for fuel cells are advantageously proton exchange membranes, anodes, cathodes, gas diffusion layers, and bipolar plates.

In a further embodiment, the fuel cells each comprise a proton exchange membrane, an anode, a cathode, at least one gas diffusion layer, and at least one bipolar plate.

In a further embodiment, the connecting device is in the form of a bolt and/or is rod-shaped and/or is in the form of a tension belt.

The clamping elements are advantageously in the form of clamping plates.

In a further variant, the gas conveying device is in the form of a fan and/or a compressor and/or a pressure vessel with oxidizing agent.

In particular, the fuel cell unit comprises at least 3, 4, 5 or 6 connecting devices.

In a further embodiment, the clamping elements are plate-shaped and/or disk-shaped and/or of planar form and/or in the form of a lattice.

Preferably, the fuel is hydrogen, hydrogen-rich gas, reformate gas or natural gas.

Advantageously, the fuel cells are substantially planar and/or disk-shaped.

In a supplementary variant, the oxidizing agent is air with oxygen or pure oxygen.

Preferably, the fuel cell unit is a PEM fuel cell unit with PEM fuel cells.

BRIEF DESCRIPTION OF THE DRAWINGS

Exemplary embodiments of the invention will be described in greater detail hereinbelow with reference to the accompanying drawings, in which:

FIG. 4 is a perspective view of a fuel cell unit in the form of a fuel cell stack, FIG. 5 is a section through the fuel cell unit according to FIG. 4, FIG. 6 is a plan view of a bipolar plate of the fuel cell unit according to the invention in a first exemplary embodiment, and FIG. 7 is a plan view of the bipolar plate of the fuel cell unit according to the invention in a second exemplary embodiment.

DETAILED DESCRIPTION

Figure 1:
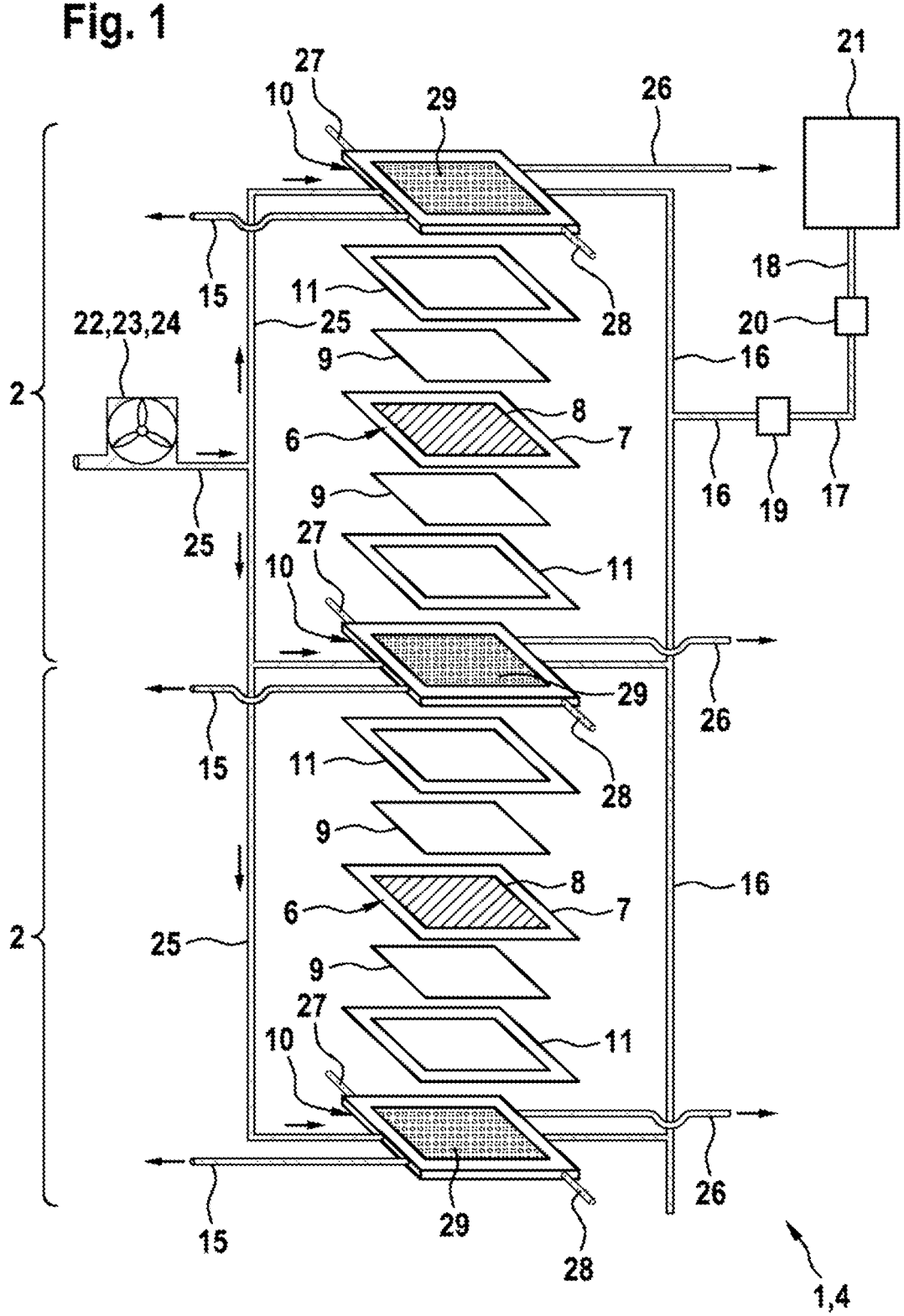
FIG. 1 is a highly simplified exploded view of a fuel cell system with components of a fuel cell.
Figure 2:
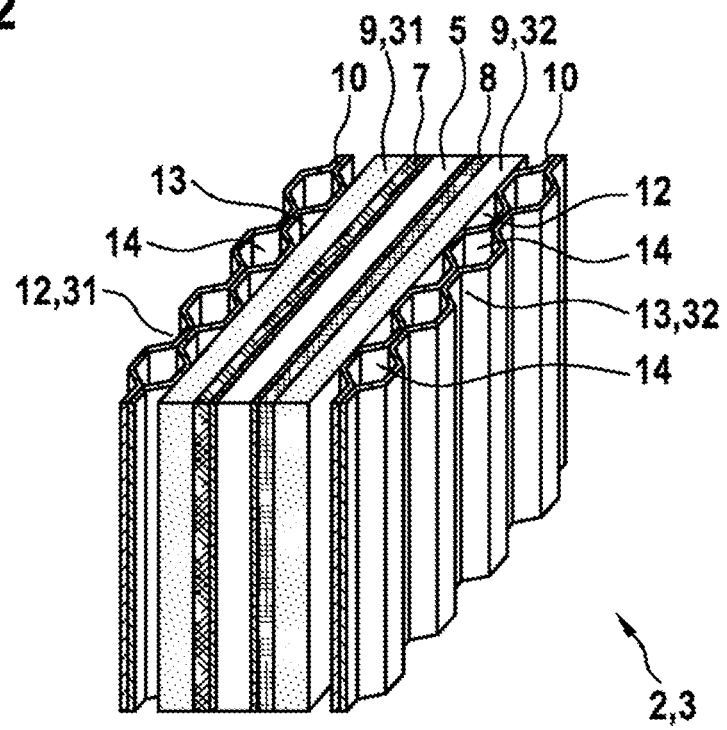
FIG. 2 is a perspective view of part of a fuel cell.
Figure 3:
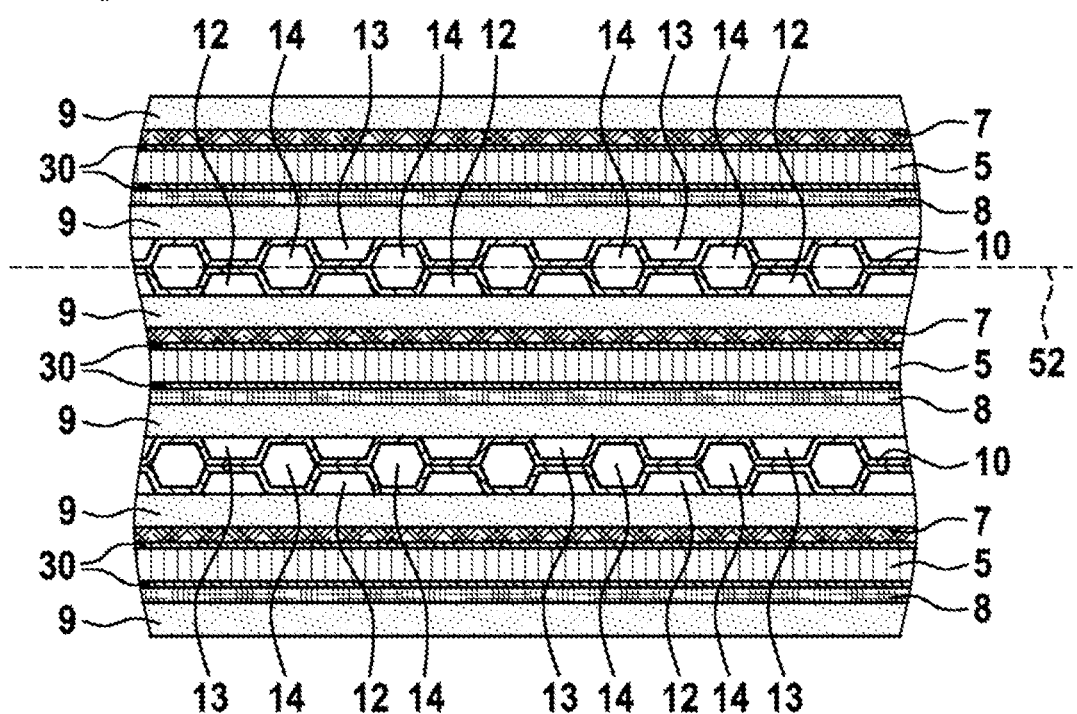
FIG. 3 is a longitudinal section through a fuel cell.

FIGS. 1 to 3 show the basic structure of a fuel cell 2 in the form of a PEM fuel cell 3 (polymer electrolyte fuel cell 3). The principle of fuel cells 2 consists in generating electrical energy, or electric current, by means of an electrochemical reaction. Hydrogen $H_2$ as the gaseous fuel is fed to an anode 7, and the anode 7 forms the negative pole. A gaseous oxidizing agent, namely air with oxygen, is fed to a cathode 8, that is to say the oxygen in the air provides the necessary gaseous oxidizing agent. A reduction (electron uptake) takes place at the cathode 8. Oxidation in the form of electron liberation is performed at the anode 7.

The redox equations of the electrochemical processes are as follows:

Cathode:

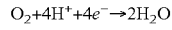

$$O_2 + 4H^+ + 4e^- \rightarrow 2H_2O$$

Anode:

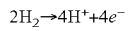

Sum Reaction Equation of Cathode and Anode:

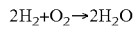

The difference in the standard electrode potentials of the electrode pairs under standard conditions as reversible fuel cell voltage or no-load voltage of the unloaded fuel cell 2 is 1.23 V. This theoretical voltage of 1.23 V is not achieved in practice. In the rest state and at low currents, voltages of over 1.0 V can be achieved, and on operation with higher currents voltages of between 0.5 V and 1.0 V are achieved. The series connection of multiple fuel cells 2, in particular a fuel cell unit 1 in the form of a fuel cell stack 1 of multiple fuel cells arranged in a stack, has a higher voltage, which corresponds to the number of fuel cells 2 multiplied by the individual voltage of each fuel cell 2.

The fuel cell 2 additionally comprises a proton exchange membrane 5 (PEM), which is arranged between the anode 7 and the cathode 8. The anode 7 and cathode 8 are layered or disk-shaped. The PEM 5 acts as the electrolyte, catalyst support and separator for the reaction gases. The PEM 5 additionally acts as an electrical insulator and prevents an electrical short circuit between the anode 7 and cathode 8. Generally, from 12 µm to 150 µm thick, proton-conducting films of perfluorinated and sulfonated polymers are used. The PEM 5 conducts the protons $H^+$ and substantially blocks ions other than protons $H^+$, so that, owing to the permeability of the PEM 5 for the protons $H^+$, charge transfer can take place. The PEM 5 is substantially impermeable to the reaction gases oxygen $O_2$ and hydrogen $H_2$, that is to say it blocks the flow of oxygen $O_2$ and hydrogen $H_2$ between a gas space 31 at the anode 7 with fuel hydrogen $H_2$ and the gas space 32 at the cathode 8 with air or oxygen $O_2$ as oxidizing agent. The proton conductivity of the PEM 5 increases as the temperature rises and the water content increases.

The electrodes 7, 8 as the anode 7 and cathode 8 lie against both sides of the PEM 5, in each case facing the gas spaces 31, 32. A unit consisting of the PEM 5 and the electrodes 7, 8 is referred to as a membrane electrode assembly 6 (MEA). The electrodes 7, 8 are pressed with the PEM 5. The electrodes 7, 8 are platinum-containing carbon particles which are bonded to PTFE (polytetrafluoroethylene), FEP (fluorinated ethylene-propylene copolymer), PFA (perfluoroalkoxy), PVDF (polyvinylidene fluoride) and/or PVA (polyvinyl alcohol) and are hot-pressed in microporous carbon-fiber, glass-fiber or plastics mats. A catalyst layer 30 is normally applied to each of the electrodes 7, 8 on the side facing the gas spaces 31, 32. The catalyst layer 30 at the gas space 31 with fuel at the anode 7 comprises nanodisperse platinum-ruthenium on graphitized carbon black particles, which are bonded to a binder. The catalyst layer 30 at the gas space 32 with oxidizing agent at the cathode 8 comprises in an analogous manner nanodisperse platinum. There are used as the binder, for example, Nafion®, a PTFE emulsion or polyvinyl alcohol.

A gas diffusion layer 9 (GDL) lies against the anode 7 and the cathode 8. The gas diffusion layer 9 at the anode 7 distributes the fuel from channels 12 for fuel evenly to the catalyst layer 30 at the anode 7. The gas diffusion layer 9 at the cathode 8 distributes the oxidizing agent from channels 13 for oxidizing agent evenly to the catalyst layer 30 at the cathode 8. The GDL 9 additionally removes water of reaction in the opposite direction to the direction of flow of the reaction gases, that is to say in a direction in each case from the catalyst layer 30 to the channels 12, 13. The GDL 9 further keeps the PEM 5 moist and conducts the current. The GDL 9 is composed, for example, of a hydrophobized carbon paper and a bonded carbon powder layer.

A bipolar plate 10 lies against the GDL 9. The electrically conductive bipolar plate 10 serves as a current collector, for discharging water and for guiding the reaction gases as process fluids through the channel structures 29 and/or flow fields 29 and for dissipating the waste heat which occurs in particular in the exothermic electrochemical reaction at the cathode 8. For dissipating the waste heat, channels 14 in the form of a channel structure 29 for the passage of a liquid or gaseous coolant as process fluid are incorporated into the bipolar plate 10. The channel structure 29 at the gas space 31 is formed by channels 12. The channel structure 29 at the gas space 32 for oxidizing agent is formed by channels 13. There is used as the material for the bipolar plates 10, for example, metal, conductive plastics materials and composite materials or graphite.

In a fuel cell unit 1 and/or a fuel cell stack 1, multiple fuel cells 2 are arranged in alignment with one another in a stack (FIGS. 4 and 5). FIG. 1 is an exploded view of two fuel cells 2 arranged in alignment with one another in a stack. A gasket 11 seals the gas spaces 31, 32 in a fluid-tight manner. In a compressed gas reservoir 21 (FIG. 1), hydrogen $H_2$ as fuel is stored at a pressure of, for example, from 350 bar to 700 bar. From the compressed gas reservoir 21, the fuel is guided through a high-pressure line 18 to a pressure reducer 20 for reducing the pressure of the fuel in a medium-pressure line 17 by approximately from 10 bar to 20 bar. From the medium-pressure line 17, the fuel is guided to an injector 19. At the injector 19, the pressure of the fuel is reduced to an injection pressure of between 1 bar and 3 bar. From the injector 19, the fuel is fed to a feed line 16 for fuel (FIG. 1) and from the feed line 16 to the channels 12 for fuel, which form the channel structure 29 for fuel. The fuel thereby flows through the gas space 31 for the fuel. The gas space 31 for the fuel is formed by the channels 12 and the GDL 9 at the anode 7. After flowing through the channels 12, the fuel not consumed in the redox reaction at the anode 7 and optionally water from a controlled moistening of the anode 7 is discharged from the fuel cells 2 through a discharge line 15.

A gas conveying device 22, for example in the form of a fan 23 or a compressor 24, conveys air from the environment as oxidizing agent into a feed line 25 for oxidizing agent. From the feed line 25, the air is fed to the channels 13 for oxidizing agent, which form a channel structure 29 at the bipolar plates 10 for oxidizing agent, so that the oxidizing agent flows through the gas space 32 for the oxidizing agent. The gas space 32 for the oxidizing agent is formed by the channels 13 and the GDL 9 at the cathode 8. After flowing through the channels 13, or the gas space 32 for the oxidizing agent, the oxidizing agent not consumed at the cathode 8 and the water of reaction formed at the cathode 8 owing to the electrochemical redox reaction is discharged from the fuel cells 2 through a discharge line 26. A feed line 27 serves to feed coolant into the channels 14 for coolant, and a discharge line 28 serves to discharge the coolant guided through the channels 14. The feed and discharge lines 15, 16, 25, 26, 27, 28 are shown as separate lines in FIG. 1 for reasons of simplicity and are structurally actually formed at the end region in the vicinity of the channels 12, 13, 14 as aligned fluid openings 42 at sealing plates 41 in the form of a prolongation at the end region of the bipolar plates 10 located one on top of the other (FIGS. 6 and 7) and membrane electrode assemblies 6 (not shown). The fuel cell stack 1 together with the compressed gas reservoir 21 and the gas conveying device 22 forms a fuel cell system 4.

In the fuel cell unit 1, the fuel cells 2 are arranged between two clamping elements 33 in the form of clamping plates 34. An upper clamping plate 35 lies on the uppermost fuel cell 2 and a lower clamping plate 36 lies on the lowermost fuel cell 2. The fuel cell unit 1 comprises approximately from 200 to 400 fuel cells 2, not all of which are shown in FIG. 4 for reasons of graphic representation. The clamping elements 33 apply a pressing force to the fuel cells 2, that is to say the upper clamping plate 35 lies with a pressing force on the uppermost fuel cell 2 and the lower clamping plate 36 lies with a pressing force on the lowermost fuel cell 2. The fuel cell stack 1 is thus clamped in order to ensure tightness for the fuel, the oxidizing agent and the coolant, in particular owing to the resilient gasket 11, and in addition to keep the electrical contact resistance within the fuel cell stack 1 as low as possible. In order to clamp the fuel cells 2 by means of the clamping elements 33, four connecting devices 39 in the form of bolts 40 are formed on the fuel cell unit 1 and are subjected to tension. The four bolts 40 are fixedly connected to the clamping plates 34.

FIGS. 1 to 5 serve merely to illustrate the basic functioning of fuel cells 2, and some features that are essential to the invention are not depicted in FIGS. 1 to 5.

FIG. 6 shows the bipolar plate 10 of the fuel cell 2 of a fuel cell unit 1 according to the invention in a first exemplary embodiment. The bipolar plate 10 is composed of two shaped plates, namely an upper plate and a lower plate (FIGS. 2 and 3), so that the channels 12, 13 and 14 are formed in the bipolar plate 10 as three separate channel structures 29. The fluid openings 42 at the sealing plates 41 of the bipolar plates 10 and membrane electrode assemblies 6 are arranged within the fuel cell unit 1 in alignment with one another in a stack, so that feed and discharge channels 43, 44, 48, 49, 50, 51 are formed. Gaskets (not shown) are thereby arranged between the sealing plates 42 for the fluid-tight sealing of the feed and discharge channels 43, 44, 48, 49, 50, 51 formed by the fluid openings 42. The bipolar plates 10 (FIG. 6) and membrane electrode assemblies 6 are substantially rectangular and have a longitudinal extent 53 as a length in a longitudinal direction 57 and a transverse extent 54 in a transverse direction 58. The substantially layered bipolar plates 10, membrane electrode assemblies 6 and gas diffusion layers 9 span notional planes 52. The plane of the drawing of FIG. 6 is oriented in the notional planes 52 or parallel thereto.

The fuel cell unit 1, the fuel cells 2 and the bipolar plates 10 with the sealing plates 41 have two opposing longitudinal sides 55 located opposite one another in the transverse direction 58 as ends in the transverse direction 58, and two opposing transverse sides 56 located opposite one another in the longitudinal direction 57 as ends in the longitudinal direction 57. A manifold structure 45 is formed between the transverse side 56 shown on the left in FIG. 6 and an inlet region 37 at the channel structure 29 for the introduction of a first process fluid in the form of the oxidizing agent into the channels 13, of a second process fluid in the form of the coolant into the channels 14, and of a third process fluid in the form of the fuel into the channels 12. A feed channel 43 for oxidizing agent, a feed channel 50 for coolant, and a feed channel 48 for fuel are arranged in a manifold structure 45.

The transverse extent 64 of the inlet region 37 of the channel structure 29 corresponds to the transverse extent 65 of the outlet region 38 of the channel structure 29 and is slightly smaller than the transverse extent 54 of the bipolar plate 10, that is to say the distance in the transverse direction 58 between the two longitudinal sides 55. The transverse extents 64, 65 correspond substantially to the transverse extent 63 of the channel structure, that is to say the inlet and outlet regions 37, 38 are formed at the entire end region in the longitudinal direction 57 of the channel structure 29. The longitudinal extent 62 of the channel structure is approximately from 60% to 90% of the longitudinal extent of the bipolar plate 10.

The transverse extent 66 of the feed channel 43 for oxidizing agent is only slightly smaller than the transverse extent 64 of the inlet region 37 of the channel structure, so that, for guiding the oxidizing agent from the feed channel 43 for oxidizing agent into the channels 13 for oxidizing agent, which begin at the inlet region 37, substantially no transverse distribution of the oxidizing agent in the transverse direction 58 is necessary, but substantially only longitudinal distribution, or longitudinal guiding, in the longitudinal direction 57. For this reason, substantially only first manifold channels 59, which are oriented substantially parallel to the longitudinal direction 57, are guided from the feed channel 43 to the inlet region 37.

The transverse extent 67 of the feed channel 50 for coolant is substantially smaller than the transverse extent 64 of the inlet region 37 of the channel structure, so that, for guiding the coolant from the feed channel 50 for coolant into the channels 14 for coolant, which begin at the inlet region 37, both transverse distribution of the coolant in the transverse direction 58 and longitudinal distribution, or longitudinal guiding, in the longitudinal direction 57 are necessary. For this reason, second manifold channels 60 for the second process fluid in the form of the coolant are guided from the feed channel 50 to the inlet region 37, and the second manifold channels 60 are oriented relative to the longitudinal direction 57 at an angle which is less than 45°.

The transverse extent 68 of the feed channel 48 for fuel is substantially smaller than the transverse extent 64 of the inlet region 37 of the channel structure, so that, for guiding the fuel from the feed channel 48 for fuel into the channels 12 for fuel, which begin at the inlet region 37, both transverse distribution of the fuel in the transverse direction 58 and longitudinal distribution, or longitudinal guiding, in the longitudinal direction 57 are necessary. For this reason, third manifold channels 61 for the third process fluid in the form of the fuel are guided from the feed channel 48 to the inlet region 37, and the third manifold channels 61 are oriented relative to the longitudinal direction 57 at an angle which is less than 45°.

The feed channels 43, 48, 50 are formed centrally in the transverse direction. A midpoint or center of mass of the feed channels 43, 48, 50 is thus not at a distance from a centric longitudinal center line 47 in the longitudinal direction 57. The feed channels 43, 48, 50 are additionally formed axially symmetrically to the longitudinal center line 47. The center of mass as a notional center of mass corresponds to the center of mass of a plate, oriented parallel to the notional plane 52, in the form of the feed channels 43, 48, 50 in a section parallel to the notional plane 52.

The process fluids, namely the oxidizing agent, the coolant and the fuel, are introduced at the end region of the manifold structure 45 from the first manifold channels 59 for the oxidizing agent into the channels 13, from the second manifold channels 60 for the coolant into the channels 14, and from the third manifold channels 61 for the fuel into the channels 12. After the process fluids have flowed through the channels 12, 13, 14, they, that is to say the process fluids, leave the channel structure 29 of the bipolar plate 10 again at the outlet region 38. A collecting structure 46 is formed between the outlet region 38 and the transverse side 56 shown on the right in FIG. 6. The collecting structure 46 is formed substantially axially symmetrically and/or complementarily to the manifold structure 45.

The transverse extent of the discharge channel 44 for oxidizing agent is only slightly smaller than the transverse extent 65 of the outlet region 38 of the channel structure 29, so that, for guiding the oxidizing agent from the channels 13 for oxidizing agent, which end at the outlet region 38, to the discharge channel 44 for oxidizing agent, substantially no transverse collection of the oxidizing agent in the transverse direction 58 is necessary, but substantially only longitudinal collection, or longitudinal guiding, in the longitudinal direction 57. For this reason, substantially first collecting channels 69, which are oriented substantially parallel to the longitudinal direction 57, are guided from the outlet region 38 to the discharge channel 44.

The transverse extent of the discharge channel 51 for coolant is substantially smaller than the transverse extent 65 of the outlet region 38 of the channel structure 29, so that, for guiding the coolant from the channels 14 for coolant, which end at the outlet region 38, into the discharge channel 51 for coolant, both transverse collection of the coolant in the transverse direction 58 and longitudinal collection, or longitudinal guiding, in the longitudinal direction 57 are necessary. For this reason, second collecting channels 70 for the second process fluid in the form of the coolant are guided from the outlet region 38 into the discharge channel 51, and the second collecting channels 70 are oriented relative to the longitudinal direction 57 at an angle which is less than 45°.

The transverse extent of the discharge channel 49 for fuel is substantially smaller than the transverse extent 65 of the outlet region 38 of the channel structure, so that, for guiding the fuel from the channels 12 for fuel, which end at the outlet region 38, into the discharge channel 49 for fuel, both transverse collection of the fuel in the transverse direction 58 and longitudinal collection, or longitudinal guiding, in the longitudinal direction 57 are necessary. For this reason, third collecting channels 71 for the third process fluid in the form of the fuel are guided from the outlet region 38 into the discharge channel 49, and the third collecting channels 71 are oriented relative to the longitudinal direction 57 at an angle which is less than 45°.

The discharge channels 44, 49, 51 are formed centrally in the transverse direction. A midpoint of the discharge channels 44, 49, 51 is thus not at a distance from a centric longitudinal center line 47 in the longitudinal direction 57. The discharge channels 44, 49, 51 are additionally formed axially symmetrically to the longitudinal center line 47.

FIG. 7 shows a bipolar plate 10 of the fuel cell 2 of the fuel cell unit 1 according to the invention in a second exemplary embodiment. Substantially only the differences compared to the first exemplary embodiment will be described hereinbelow. The feed channel 43 for oxidizing agent is in two-part form, or two feed channels 43 are formed, and the feed channel 50 for coolant is arranged between the two feed channels 43 for oxidizing agent. The two feed channels 43 have a common midpoint, which lies on the centric longitudinal center line 47. Thus, in the second exemplary embodiment, only the two feed channels 48, 50 for coolant and fuel are arranged side by side in the longitudinal direction 57.

The discharge channel 44 for oxidizing agent is in two-part form, or two discharge channels 44 are formed, and the discharge channel 51 for coolant is arranged between the two discharge channels 44 for oxidizing agent. Thus, in the second exemplary embodiment, only the two discharge channels 49, 51 for coolant and fuel are arranged side by side in the longitudinal direction 57.

In the first exemplary embodiment described above, the manifold structure 45 is arranged between the transverse sides 56 and the channel structure 29, so that the process fluids flow through the channel structure 29 in the longitudinal direction 57 substantially in parallel and the inlet and outlet region 37, 38 extends in the transverse direction. In the first exemplary embodiment, the transverse extent of the inlet and outlet region 37, 38 corresponds substantially to the transverse extent 63 of the channel structure 29. In a further exemplary embodiment (not shown), the manifold structure 45 is arranged between the longitudinal sides 55 and the channel structure 29, so that the process fluids flow through the channel structure 29 in the transverse direction 58 substantially in parallel, and the inlet and outlet region 37, 38 extends in the longitudinal direction. In the second exemplary embodiment (not shown), the longitudinal extent of the inlet and outlet region 37, 38 corresponds substantially to the longitudinal extent 62 of the channel structure 29.

Taken as a whole, substantial advantages are associated with the fuel cell unit 1 according to the invention and the fuel cell system 4 according to the invention. All the process fluids are guided in the manifold structure 45 and the collecting structure 46 through the manifold channels 59, 60, 61 and the collecting channels 69, 70, 71 substantially parallel to one another. It is thus possible to achieve uniform distribution of the process fluids with a small pressure drop and temperature equalization between the process fluids owing to the transfer of heat between the process fluids. Advantageously, small differences in the temperature and humidity in the gas spaces 31, 32 for oxidizing agent and fuel and also in the channels 14 for coolant thus occur. The fuel cell unit 1 thus has a high efficiency per unit mass with minimal ageing during operation.

The invention claimed is:

1. A fuel cell unit (1) in the form of a fuel cell stack (1) for the electrochemical generation of electrical energy, comprising fuel cells (2) arranged in a stack, the fuel cells (2) each comprising a proton exchange membrane (5), an anode (7), a cathode (8), a gas diffusion layer (9), a bipolar plate (10) with three separate channel structures (29) with channels (12, 13, 14) for the separate passage of oxidizing agent, fuel and cooling fluid, and the channel structures (29) have an inlet region (37) and an outlet region (38) for the oxidizing agent, the fuel and the cooling fluid, at least one feed channel (43) for feeding oxidizing agent as process fluid into gas spaces (32) for oxidizing agent of the fuel cells (2), at least one feed channel (48) for feeding fuel as process fluid into gas spaces (31) for fuel of the fuel cells (2), at least one feed channel (50) for coolant as process fluid for feeding the coolant into a channel (14) for coolant, a manifold structure (45) for guiding and distributing the process fluids from the feed channels (43, 48, 50) into the channel structures (29) of the bipolar plates (10), wherein at least two feed channels (43, 48, 50) are formed side by side in a longitudinal direction (57) when the inlet region (37) is configured with an extent predominantly in a transverse direction (58) between a transverse side (56) of the fuel cell (2) and the channel structure (29);

wherein
all the feed channels (43, 48, 50) are arranged substantially centrally in the transverse direction (58) when the inlet region (37) is configured with an extent predominantly in the transverse direction (58) between a transverse side (56) of the fuel cell (2) and the channel structure (29).

2. The fuel cell unit as claimed in claim 1,
wherein
at least three feed channels (43, 48, 50) are formed side by side in the longitudinal direction (57) when the inlet region (37) is configured with an extent predominantly in the transverse direction (58) between a transverse side (56) of the fuel cell (2) and the channel structure (29).

3. The fuel cell unit as claimed in claim 1,
wherein
the at least one feed channel (43) for feeding oxidizing agent is the feed channel (43, 48, 50) that is at the greatest distance in the longitudinal direction (57) from the inlet region (37) of the channel structure (29) when the inlet region (37) is configured with an extent predominantly in the transverse direction (58) between a transverse side (56) of the fuel cell (2) and the channel structure (29).

4. The fuel cell unit as claimed in claim 1,
wherein
the at least one feed channel (48) for feeding fuel is the feed channel (43, 48, 50) that is at the smallest distance in the longitudinal direction (57) from the inlet region (37) of the channel structure (29) when the inlet region (37) is configured with an extent predominantly in the transverse direction (58) between a transverse side (56) of the fuel cell (2) and the channel structure (29).

5. The fuel cell unit as claimed in claim 1,
wherein
separate first, second and third manifold channels (59, 60, 61) for the first, second and third process fluid are formed in the manifold structure (45).

6. The fuel cell unit as claimed in claim 5,
wherein
two of the first, second and third manifold channels (59, 60, 61) are formed separately from one another in a direction perpendicular to notional planes (52) spanned by the fuel cells (2).

7. The fuel cell unit as claimed in claim 5,
wherein
one of the first, second and third manifold channels (59, 60, 61) is formed next to one of the other first, second or third manifold channels (59, 60, 61) in a direction parallel to notional planes (52) spanned by the fuel cells (2).

8. The fuel cell unit as claimed in claim 1,
wherein
the fuel cell unit (1) has a longitudinal extent (53) in a longitudinal direction (57) and a transverse extent (54) in a transverse direction (58), and the longitudinal direction (57) and transverse direction (58) are oriented perpendicular to one another and parallel to notional planes (52) spanned by the fuel cells (2).

9. The fuel cell unit as claimed in claim 1,
wherein
when the manifold structure (45) is formed between a transverse side (56) of the fuel cell unit (1) and the channel structure (29) of the bipolar plate (10), a transverse extent of the manifold structure (45) corresponds substantially to a transverse extent (64) of the inlet region (37) of the channel structure (29).

10. The fuel cell unit as claimed in claim 5,
wherein
the first, second and third manifold channels (59, 60, 61) are oriented at an angle relative to one another which is less than 45°.

11. The fuel cell unit as claimed in claim 1,
wherein
a transverse extent (66) or a sum of the transverse extents of the at least one feed channel (43) for oxidizing agent corresponds substantially to a transverse extent (64) of the inlet region (37) of the channel structure (29).

12. A fuel cell system (4) comprising
a fuel cell unit (1) in the form of a fuel cell stack with fuel cells (2),
a compressed gas reservoir (21) for storing gaseous fuel, and
a gas conveying device (22) for conveying a gaseous oxidizing agent to cathodes (8) of the fuel cells (2),
wherein
the fuel cell unit (1) is in the form of a fuel cell unit (1) as claimed in claim 1.

13. The fuel cell unit as claimed in claim 10,
wherein
the first, second and third manifold channels (59, 60, 61) are oriented at an angle relative to one another which is less than 30°.

* * * * *